(12) United States Patent
Berckmans et al.

(10) Patent No.: US 7,950,350 B2
(45) Date of Patent: May 31, 2011

(54) APPARATUS AND METHOD FOR PROCESSING BIORESPONSE SIGNALS, IN PARTICULAR APPARATUS AND METHOD FOR HATCHING OUT HATCHING EGGS

(75) Inventors: Daniel Albert Berckmans, Kessel-Lo (BE); Andres Van Brecht, Leuven (BE); Jean-Marie Aerts, Haasrode (BE); Lode Peeters, Zulte (BE); Ivan Van der Beken, Zulte (BE); Paul Degraeve, Zulte (BE)

(73) Assignee: Katholieke Universiteit Leuven, Leuven (BE)

( * ) Notice: Subject to any disclaimer, the term of this patent is extended or adjusted under 35 U.S.C. 154(b) by 1029 days.

(21) Appl. No.: 10/567,610

(22) PCT Filed: Aug. 11, 2004

(86) PCT No.: PCT/IB2004/002619
§ 371 (c)(1),
(2), (4) Date: Mar. 5, 2007

(87) PCT Pub. No.: WO2005/013678
PCT Pub. Date: Feb. 17, 2005

(65) Prior Publication Data
US 2008/0041317 A1 Feb. 21, 2008

(30) Foreign Application Priority Data
Aug. 12, 2003 (EP) .................................. 03077519

(51) Int. Cl.
*A01K 41/00* (2006.01)
*A01K 43/00* (2006.01)

(52) U.S. Cl. .................... 119/300; 119/306; 119/6.8

(58) Field of Classification Search ............. 119/300, 119/306, 6.8, 322, 311, 319, 328, 315, 317; 356/52, 53, 55
See application file for complete search history.

(56) References Cited

U.S. PATENT DOCUMENTS

| 1,725,799 | A | | 8/1929 | Henrion | |
|---|---|---|---|---|---|
| 4,914,672 | A | * | 4/1990 | Hebrank | 374/124 |
| 4,955,728 | A | * | 9/1990 | Hebrank | 374/124 |
| 6,234,320 | B1 | * | 5/2001 | Hebrank | 209/510 |
| 6,427,844 | B2 | * | 8/2002 | Hebrank | 209/510 |
| 7,041,439 | B2 | * | 5/2006 | Phelps et al. | 435/4 |
| 7,333,187 | B2 | * | 2/2008 | Hebrank | 356/53 |
| 2002/0157613 | A1 | * | 10/2002 | Phelps et al. | 119/6.8 |
| 2004/0065263 | A1 | * | 4/2004 | Hebrank et al. | 119/6.8 |
| 2008/0149033 | A1 | * | 6/2008 | Hebrank et al. | 119/6.8 |

FOREIGN PATENT DOCUMENTS

| NL | 1016636 | 5/2002 |
|---|---|---|
| WO | WO 02/098213 A2 | 12/2002 |

* cited by examiner

*Primary Examiner* — Yvonne R. Abbott
(74) *Attorney, Agent, or Firm* — Hoffmann & Baron, LLP (57) ABSTRACT

An apparatus for measuring, with infrared thermometers, temperatures of hatching eggs placed in nests of hatching trays which are arranged in an incubator, wherein, for a pre-selected number of trays, the temperature is measured of a predetermined number of eggs, wherein during the hatching period, each individual thermometer contactlessly measures the temperature around a corresponding individual egg arranged in the incubator according to a pre-entered measurement scheme, wherein the measuring signals obtained control a temperature control regulation.

18 Claims, 6 Drawing Sheets

APPARATUS AND METHOD FOR PROCESSING BIORESPONSE SIGNALS, IN PARTICULAR APPARATUS AND METHOD FOR HATCHING OUT HATCHING EGGS

This application is the U.S. National Phase of International Application Number PCT/IB2004/002619 filed on 11 Aug. 2004, which is incorporated herein by reference.

BACKGROUND OF THE INVENTION

The invention relates to a method according to the preamble of claim 1, and further to a method as described in the preambles of the claims 7 and 12, respectively.

The present invention is operative and applicable in a field of the art directed to monitoring and controlling bioprocesses. A bioprocess is understood to mean a process of which a living organism forms an important part and in which such an organism plays a corresponding role. In such a process, there is always a bioresponse, which is understood to mean the reaction of such an organism to its environment. This environment is denoted in more detail as everything which is not genetically determined with regard to such an organism, and particularly relates to the microenvironment around and near such an organism.

As examples of bioresponse, which can generally be denoted as the whole of reflections of the metabolic activity of such an organism, particularly temperature and pulse can be mentioned, as well as many other responses which are well known to a skilled person. In order to be able to scan, monitor and measure such responses, in manners known to a skilled person, suitable sensors and equipment whose action is physical or chemical are used for this purpose. It will be clear to any skilled person what is meant by this, also including combinations of actions, and for instance also biochemical action.

During scanning, monitoring and measuring, such bioresponses are expressed in biovariables, while the scanning, monitoring and measuring with the sensors and equipment takes place by means of bioresponse signals.

Such measurements take place online. It will be clear that, in the case of monitoring and controlling, the processing of the bioresponse signals is real-time. It further needs to be noted that such bioprocesses are examples of dynamic processes. The scanning, monitoring and measuring are also considered dynamic, which is, in the field of signal processing, understood to mean that the sampling frequency, or sampling rate, follows the well-known Nyquist theorem. Hereinafter, accordingly, in addition to 'dynamic', 'continuous' will also be used, which clearly expresses that such bioresponses relate to a bioprocess of a living organism which proceeds and continues without interruptions.

The present invention relates to a particular bioprocess, namely the incubation process. This is known to be a very complex process whose ranges of temperature and gas concentrations in the microenvironments around and near a hatching egg are roughly known, but where pre-entered controls are not adequate to optimally guide such an organism. While the living space as a whole accommodates groups, collections or colonies of such organisms, and it is not uncommon to measure and to control therein, precisely such an approach will always relate to an average to which the bioresponses as such are indirectly related at most. Precisely in the bioresponse, the previous history of a hatching egg itself is implicit, with options to be considered being age and feed of the laying hens, as well as the laying season and the climate in the coops; in other words, each batch of hatching eggs will accordingly shown other responses.

A method according to the preamble of claim 1 is known from WO02098213. Therein, a method and a system for controlling and monitoring bioprocesses are described, in particular controlling and monitoring growth processes of living organisms such as cattle and poultry, including monitoring bioresponse phenomena. More in particular, the manner is described in which bioresponse signals are used as measuring signals of bioresponse variables in a model in order to thus dynamically and accurately monitor and control the growth process of an animal in order to increase the economic quality of the animals, for instance the production of biomass. It is described in detail how a model, and the mathematical basis thereof, for online modeling and real-time processing of measured signals is formulated by means of which a control according to the MPC principle (model predictive control) is used.

Up to now, it has been found hardly possible to carry out online measurements in a hatching chamber, in particular online measuring in the microenvironments around hatching eggs. An explanation for this is to be found in the fact that the hatching chamber forms a very complex living space, comprised in a construction and dominated by a climate whose parameters are not only linked to each other in an extremely complex manner, but by which, further, the microenvironments around the hatching eggs, often many tens of thousands, cannot unambiguously be monitored and be controlled. In particular, this has entailed that the right instrumentation was often lacking.

SUMMARY OF THE INVENTION

In order to provide a solution in this line of industrial bioproduction as well, the method according to the present invention is characterized in that the living space comprises an incubator for hatching out hatching eggs, while the bioresponse variables are measured and controlled in a physical and/or chemical manner, for instance in the form of optical, electrical, magnetic, acoustic or mechanical bioresponse signals, or combinations thereof.

In a surprising manner, it has been found that, with such a manner of monitoring and controlling hatching processes in the microenvironments of the hatching eggs in hatching chambers, remarkably higher hatching results are achieved.

Depending on the bioresponse variable, the invention further provides measurement and control in an invasive as well as in a non-invasive manner. Thus, the external influencing of the bioprocess can be chosen and set in any desired manner.

In particular, the method is characterized in that the bioresponse variables for hatching eggs are chosen from, for instance, but not exclusively, eggshell temperature, weight loss, pulse, blood pressure, respiration, growth, growth rate, activity, heat production, moisture production, and sound production; more in particular that the bioresponse signals for hatching eggs are chosen from, for instance, but not exclusively, temperature, humidity, gas concentrations, sound intensity, and sound frequency; further, that the living space control model comprises an intelligent control algorithm for a process control based on a systematic or mathematical processing rule, for instance, but not exclusively, a so-called model-based control with prediction; or a process control with so-called fuzzy logic; and further that the living space control model controls the hatching out according to directions obtained and determined after expertise.

The method as described in the preamble of claim 7 is known from, for instance, NL1016636. Here, inter alia the egg temperature is considered a growth feature, while, according to the method claimed therein, particularly the reaction of the egg temperature to the external change of the temperature in the hatching chamber is measured, and while the measured reaction is then used to adjust the temperature in the hatching chamber. The process control described in this document can be summarized as: adjustment after agitation.

In such a method, no regard is paid to measuring and controlling bioresponse variables, more in particular measuring and controlling the course and the dynamics of the energy transport from and to a hatching egg, such as for instance the heat conditions directly around the hatching egg. By attempting to agitate the egg temperature in this manner and then adjusting the air temperature in the hatching chamber, the required energy balance as a function of the hatching phase or other more specific features of the microenvironment during the hatching process around such a hatching egg are not anticipated at all. Since it is known that, during the entire hatching period, the embryo temperature is constant or virtually constant, while, during about the first half of the hatching period, the hatching process proceeds endothermically, and, during the second half, exothermically, such an agitation will, conversely, disturb the microclimate instead of following it as will be the case in a natural environment.

In order to monitor precisely the microclimate or microenvironment around a hatching egg that accurately, and possibly adjust it, and more in particular to imitate that microclimate precisely as carefully as possible, the method according to the present invention is characterized in that the method successively comprises the following steps:

entering a hatching egg target temperature Tep into the control at the start of the hatching process;

measuring the egg temperature Te at a determined point in time after the start;

comparing the measured Te and Tep, where, in the case of a difference between Te and Tep, an air temperature signal for adjusting the air temperature Ta according to an air temperature regulation is delivered; and repeating these steps during the hatching process at a determined next point in time.

In a very suitable manner, this method reacts to the 'body-specific' signals of a hatching egg. In this manner of controlling parameters, both the living space as a whole and the microenvironment around each hatching egg are involved.

More in particular, the method is characterized in that, for adjusting the air temperature Ta, the method further successively comprises the following steps:

entering an air target temperature Tap into the control at the start of the hatching process, while, further, an air temperature control range A is entered between limit temperatures Tap(min) and Tap(max), with Tap(min) <Tap<Tap(max);

measuring the air temperature Ta at a determined point in time after the start;

comparing measured Ta with the temperatures in A, where, in the case that Ta has increased or decreased by a predetermined difference, the air temperatures are adjusted according to a determined control scheme; and repeating these steps during the hatching process at a determined next point in time.

In a very direct and traceable manner, the microclimate around a hatching egg, and the macroclimate, that is, the climate in the hatching chamber considered as a whole, have been coupled to each other in this manner. More in particular, in reaction to a possible deviation from the egg target temperature, the climate in the room is adjusted. Thus, in a very suitable manner, both the endothermic and the exothermic phase during the hatching stage are taken into account.

Further, the method is characterized in that it comprises that, when the air temperature Ta exceeds one of the limit temperatures of A, an alarm signal is delivered.

In this manner, too great deviations, although automatically adjusted, are prevented from not being noted, or not being noted in time, by the operator of such an installation. A possible cause is usually not to be found in the hatching process itself but in a trouble of a technical nature in the hatching chamber. By such an alarming system, great losses of hatching eggs, and accordingly capital, can be avoided.

In a special embodiment, the method is characterized in that the egg temperatures are contactlessly measured, more in particular that the egg temperatures are measured with the apparatus according to any one of claims 12, 13, 14 or 15.

The apparatus according to the preamble of claim 12 is known from a publication on the website of Pakissan Agri Professionals Institutes Network, PAK APIN, www.pakissan.com, "Systematic Analysis of Embryo Temperature, February 2003, in which it is described how, for a batch of eggs which are hatched according to the single-stage method, the temperature of a preselected number of eggs is measured manually with an infrared thermometer of the clinical thermometer type, where the thermometer is placed manually on such an egg. This temperature is referred to as eggshell temperature. Then, on the basis of such a measurement, the setting temperature of the hatching chamber can be adjusted. Further, it needs to be noted that, in general, it will be attempted to determine the eggshell temperature of a representative number of eggs in order to thus obtain a reliable average in order to thus bring about the right control setting.

It will be clear to anyone that such a manner of manual measurement has quite a few disadvantages. For instance, the entering will cause a considerable disturbance of the setting and the development of relevant hatching parameters such as temperature, humidity, water vapor concentration, and carbonic acid concentration.

In order to remedy the drawbacks described, the apparatus according to the present invention is characterized in that, during the hatching period, each individual thermometer contactlessly measures the temperature of a corresponding individual egg according to a pre-entered measuring scheme, while the measuring signals obtained control a temperature control regulation.

What needs to be considered an advantage of the use of such an apparatus is that, with this manner of automatic measurement, and hence, with the avoidance of entering into an operative incubator, the risk of injury by the rotating pulsator, which is considered considerable, is eliminated.

Further, the apparatus according to the invention is characterized in that the thermometers have been provided on holders placed on the hatching trays between the eggs, by which thermometers the temperatures of at least two individual hatching eggs are measured.

In an advantageous manner, it is thus achieved that the temperature regulation is controlled by a parameter value directly delivered by the egg into its microenvironment, also referred to as a bioresponse. Where, up to now, in general, averages of parameter values in the hatching chamber as a whole were measured, by means of which the climate as a whole in that room was adjusted, the present invention provides, in a very suitable manner, a control by means of measurements in the microclimate or microenvironment around or near each egg.

In a further embodiment, the apparatus according to the invention is characterized in that, further, a robot is comprised to automatically position the holders near the hatching eggs.

BRIEF DESCRIPTION OF THE DRAWINGS

The apparatus according to the invention will be further elucidated with reference to a drawing, in which.

DETAILED DESCRIPTION OF THE INVENTION

In the different Figures, same parts are numbered alike.

Figure 1:
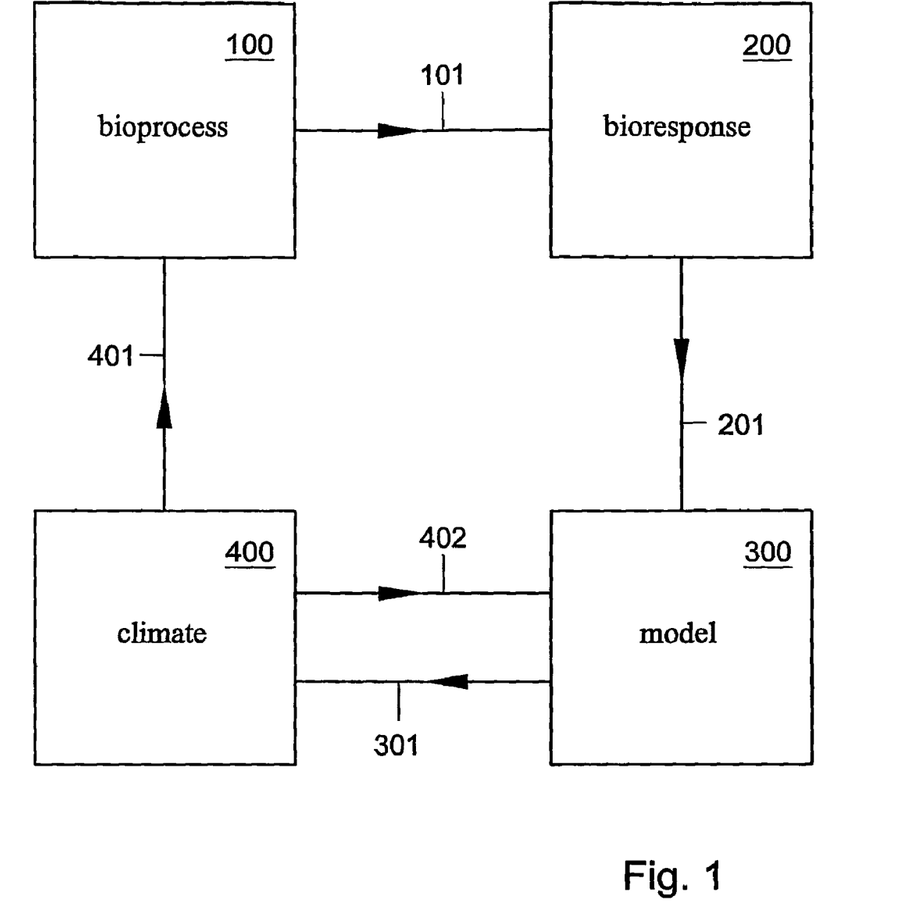
FIG. 1 shows a diagram of a model-controlled bioprocess according to the present invention.

In FIG. 1, the cycle of monitoring and controlling a bioprocess, represented by block 100, can clearly be recognized. The arrow connections between the individual blocks designate reactions, data flows, or signals. Starting with the bioprocess 100, during the progress thereof, optionally, reactions and changes 101 take place which are typified and recognized as bioresponse 200. This bioresponse 200 is recognizable during measurement of bioresponse variables, where bioresponse signals 201 are obtained. These are, in turn, entered in a model 300, which also includes a control to be carried out therewith as well as entering and setting limit values and target values of these variables. By means of signals 301, the living space in the hatching chamber, more in particular the climate 400, is then controlled. Further climate changes 401 influence, in turn, the bioprocess, and signals 402 which indicate the changes are fed back to the model 300 which also comprises the control, as mentioned hereinabove.

More in particular, the bioresponse variables in the form of optical, electrical, magnetic or mechanical bioresponse variables, or combinations thereof, are measured, which may, with hatching eggs, involve, for instance, variables such as weight loss, pulse, blood pressure, respiration, growth, growth rate, activity, heat production, moisture production, and sound production. The corresponding signals are then, for instance, but not exclusively, temperature, humidity, gas concentrations, light intensity, light frequency, sound intensity, and sound frequency. Unlike in the past, it has been found that, with further developed instrumentation and the corresponding software, hatching processes can be guided with great advantage. In particular, with infrared detection, an accurate bioresponse control with regard to the temperature can be obtained. An exemplary embodiment thereof will be described in detail hereinbelow.

The model 300 shown in FIG. 1 generally relates to a control algorithm entered into a processor in order to thus control the relevant parameters of such a living space, in this case the hatching chamber. In particular, it usually relates the climate control since hatching eggs are living units closed in themselves to which external nutrition does not apply. Examples of such controls are a so-called model-based control with prediction as described in more detail in WO02098213. Process controls with so-called fuzzy logic are also used. Many examples thereof are known as well. Further, often, directions are used which have been obtained and determined after expertise, for instance of a hatching expert whose experience can seldom be surpassed. Nevertheless, a disadvantage is that this experience is very individual and the laying down thereof in rules is not always sufficient. With great advantage, such advanced, and largely objectified, model-based controls, in particular as understood to mean model-based control or MPC, make it possible that the hatching process gets a position in the food chain which can be monitored and checked more adequately. It becomes increasingly important to make living conditions from laying hen to hatching chick or, after that, from meat chick to meat chicken, controllable, while, with great advantage, a chain with reliable links is obtained by means of which the increasing demand for highly qualified food can be met.

Figure 2:
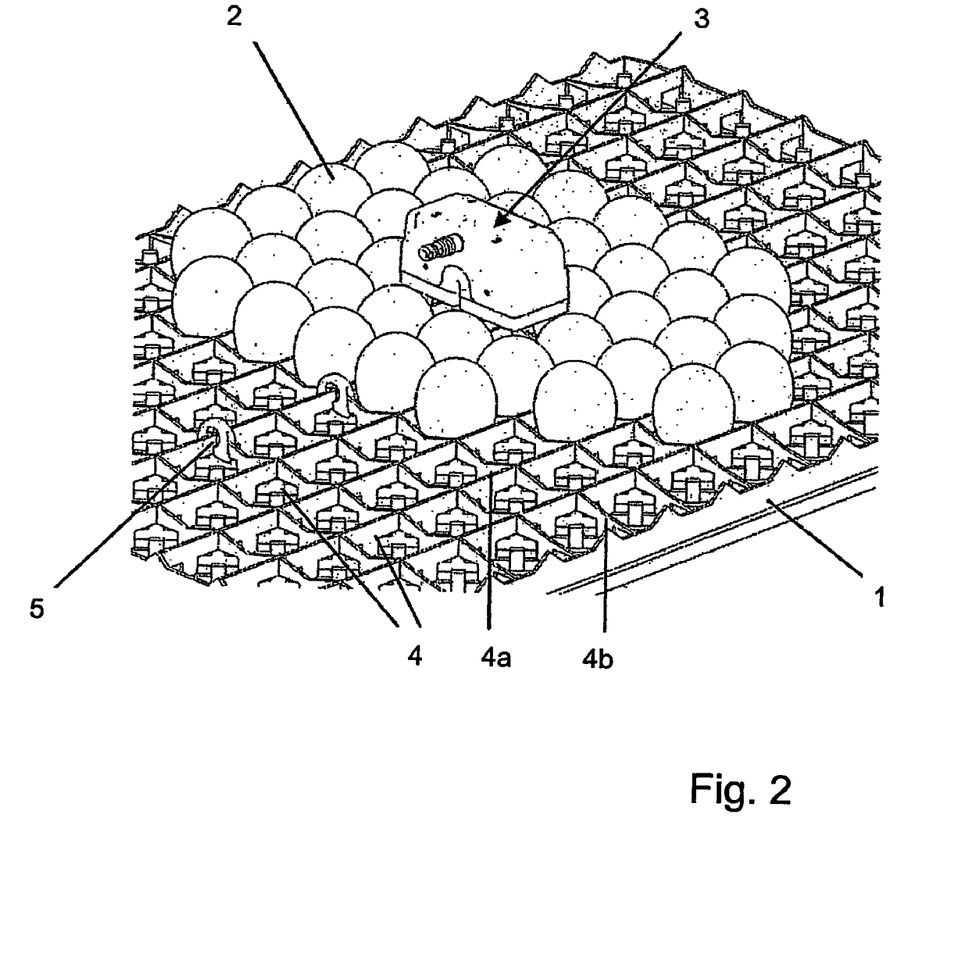
FIG. 2 shows a view of a hatching tray, partly filled with eggs, and with the apparatus according to the invention therebetween.

FIG. 2 shows a hatching tray 1 with hatching eggs 2 in nests 4. Such arrangements are generally used in hatching chambers. In the usual manner, eggs are placed in compartments, further referred to as nests, of hatching trays, which are usually from plastic, and hence well cleanable. The nests 4 have nest edges 4a and 4b, in directions perpendicular to each other. Further, the nests are worked open on a number of sides to allow the required air circulation. These hatching trays are, in turn, placed in racks of trolleys or carts, of which a number fit in a hatching chamber. In such hatching chambers, the natural hatching climate is imitated as much as possible. Parameters such as temperature, air humidity, carbonic acid content and oxygen content are carefully measured, and adjusted if necessary. In order to imitate the natural hatching process as much as possible, the racks are usually tiltable.

More in particular, it is attempted to check not only the climate in the hatching chamber as a whole, but even more the microclimate or microenvironment around the egg. For this purpose, it is desired to monitor the conditions around a hatching egg, or at least around a number of hatching eggs, and to adjust them if possible. With the exemplary embodiment of apparatus 3 as shown in FIG. 2, it has been found possible to accurately monitor the temperature of four eggs 2 in such a hatching tray 1. As this Figure shows, the apparatus has such a size that two nests are occupied, while temperature sensors have been provided in the apparatus such that, on both sides, the temperatures of each two eggs can be measured. It is clear that this measurement is not only non-invasive but also prevents disturbances which occur, for instance, with placing and replacing of thermometers.

Figure 3:
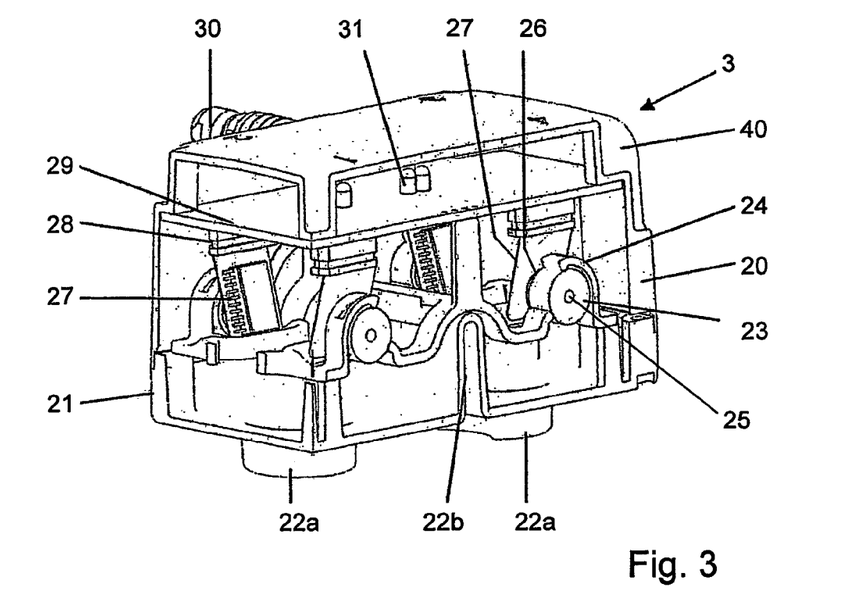
FIG. 3 shows a view of a cutaway model of this apparatus.
Figure 4:
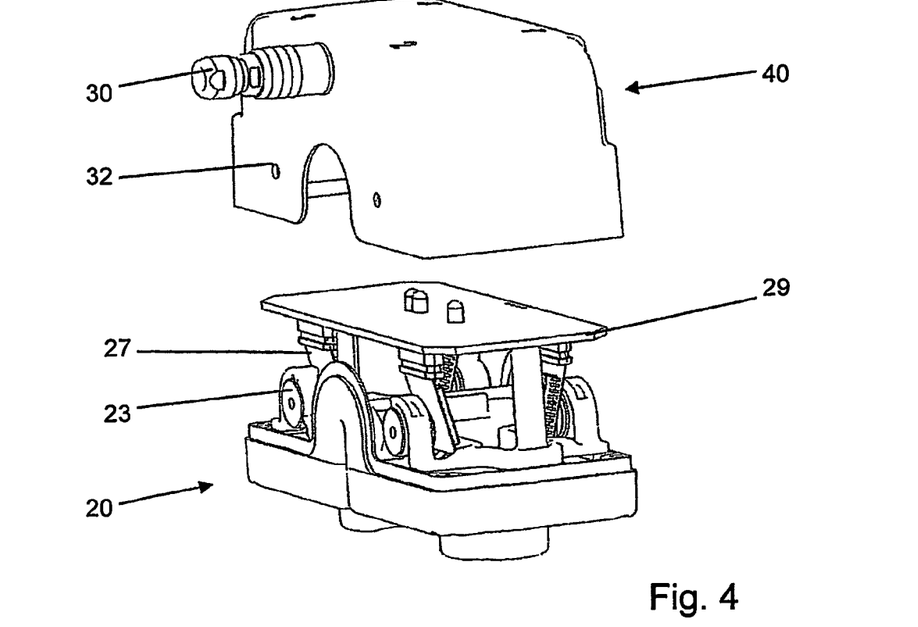
FIG. 4 shows a view of this apparatus taken apart into two parts.

FIGS. 3 and 4 show apparatus 3 in more detail. The two main parts of the apparatus 3 are formed by a holder part 20 and a lid part 40. Holder part 20 comprises a bottom 21, with two plug-in units 22a connected therewith, and further with a plug-in slot 22b, by means of which the apparatus can be clamped in the compartments or nests 4 and over the nest edges 4a, 4b of the hatching tray 1, respectively. These parts and the parts to be directly connected therewith are all from the same plastic, optionally from a combination of plastics.

The heart of the apparatus is formed by the sensors 23, in this exemplary embodiment four in number, by means of which the temperatures of the eggs 2 in the directly adjoining nests 4 are measured. These sensors are of the type by means of which infrared radiation is received, where the incident light energy is converted into a measuring signal. Such sensors are generally known and will not be elucidated in detail here. A type which may, for instance, be used for this purpose is marketed by the Melexis firm and is known by the designation MLX90601.

In more detail, the sensor comprises an opening 25 for the incident radiation, the sensor is accommodated in a setting 24 which is also from plastic, the sensor has a sensor element 26 on the side facing away from the opening 25, and this sensor element is directly connected with a chip 27. One of the sides of the chip is, by means of a connector 28, connected with a printed circuit board 29 which is common to all four sensors. This printed circuit board is, in turn, connected with a cable connector 30 from which signal cables (not shown) lead to a signal-processing unit. These cables are led along upstanding edges, in this exemplary embodiment the edges 4a, of different nests 4 of the hatching tray 1 and are guided and clamped by clamps 5, as shown in FIG. 2. The signal-processing unit is usually a computer, arranged directly outside the hatching chamber to enable and carry out checking, controlling and setting in this manner, in particular for a living space control model as elucidated hereinabove. Further, in the lid part 40, windows 32 have been provided through which the radiation can reach the sensors 23, more in particular the openings 25 thereof. Further, it needs to be noted that each sensor apparatus has been calibrated so that, in an advantageous manner, each sensor can be used in a different hatching chamber.

It will be clear to any skilled person that the measuring signals, to be considered as bioresponse signals and coming from sensor apparatuses according to the present invention, can be combined with measuring signals relating to other climate parameters. In a subsequent processing of such signals, it will be possible to regulate quantities such as heat transport, heat transfer and energy content, of the chamber as a whole or, also, a part thereof.

Figure 5:
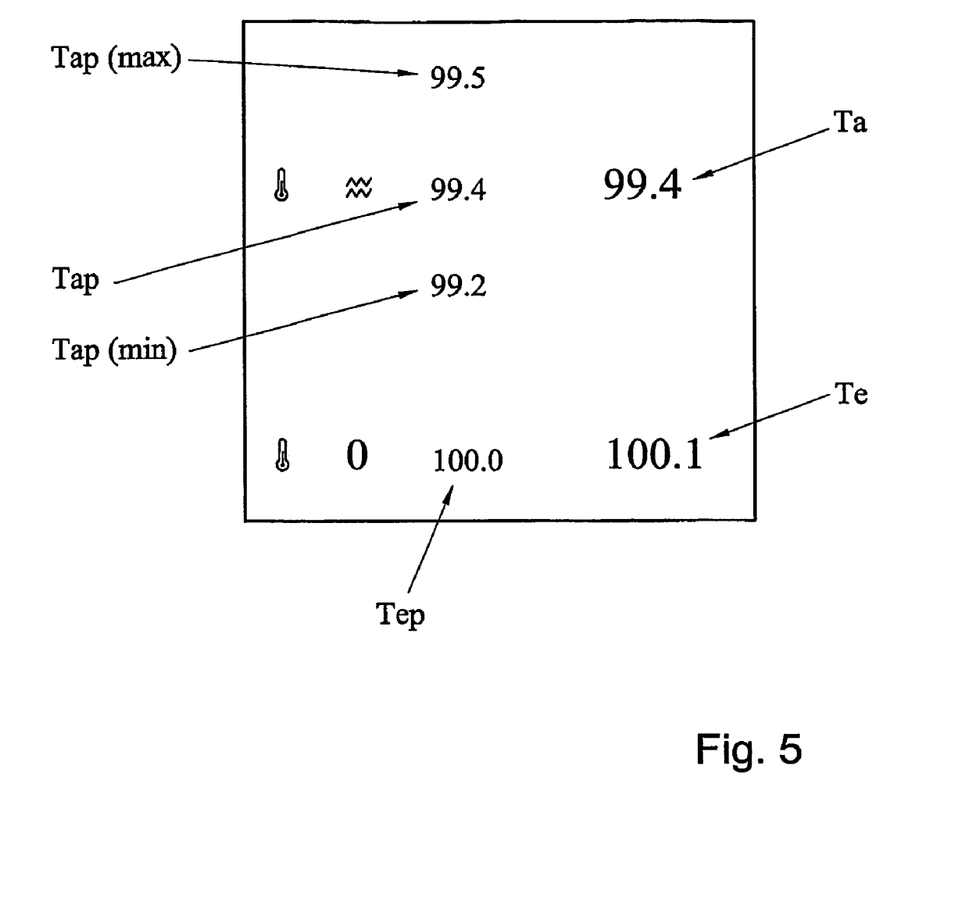
FIG. 5 shows an example of a display of a part of a screen of a control computer.
Figure 6:
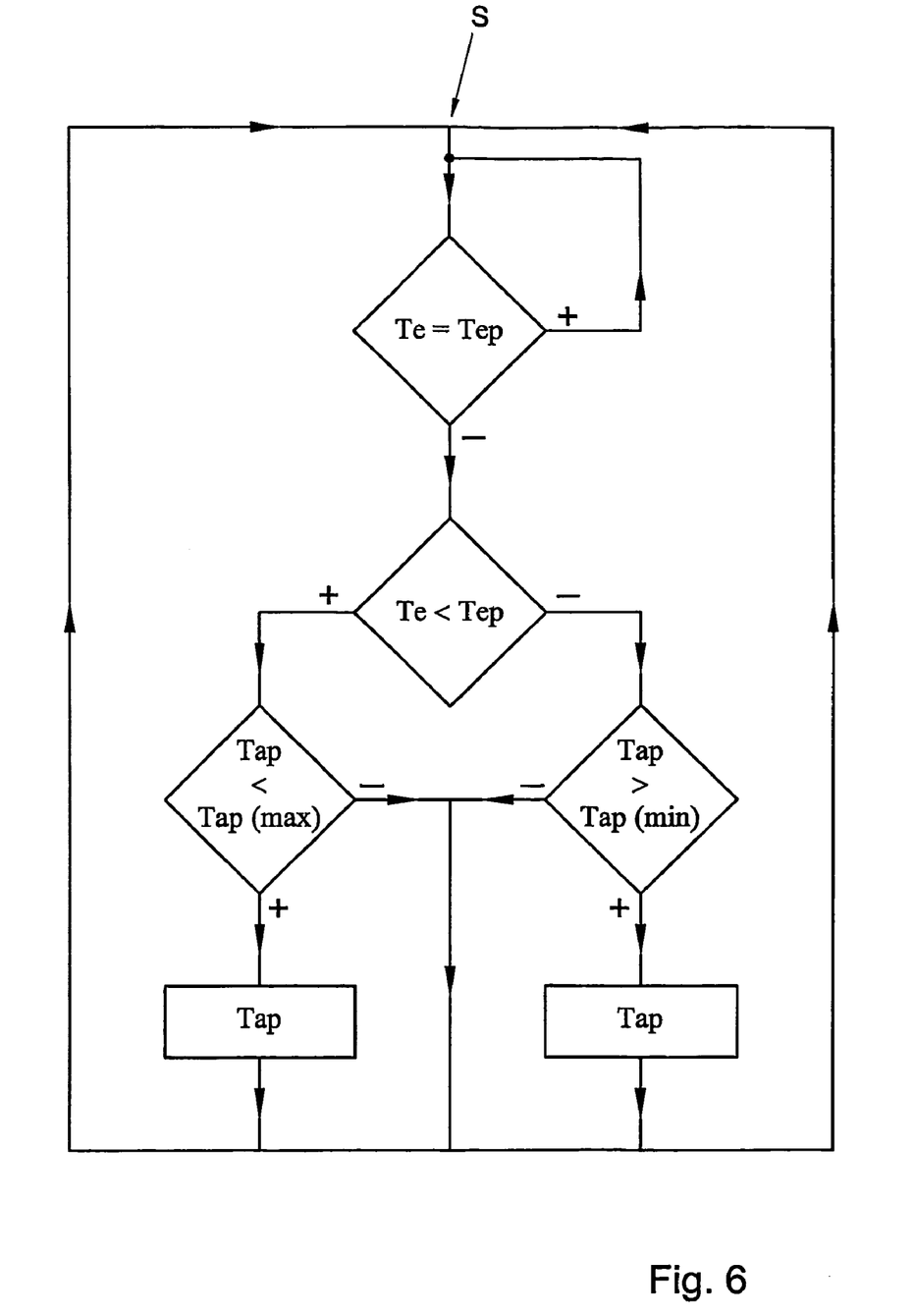
FIG. 6 shows a flow diagram of the method for the bioresponse to egg temperature measurements.
Figure 7:
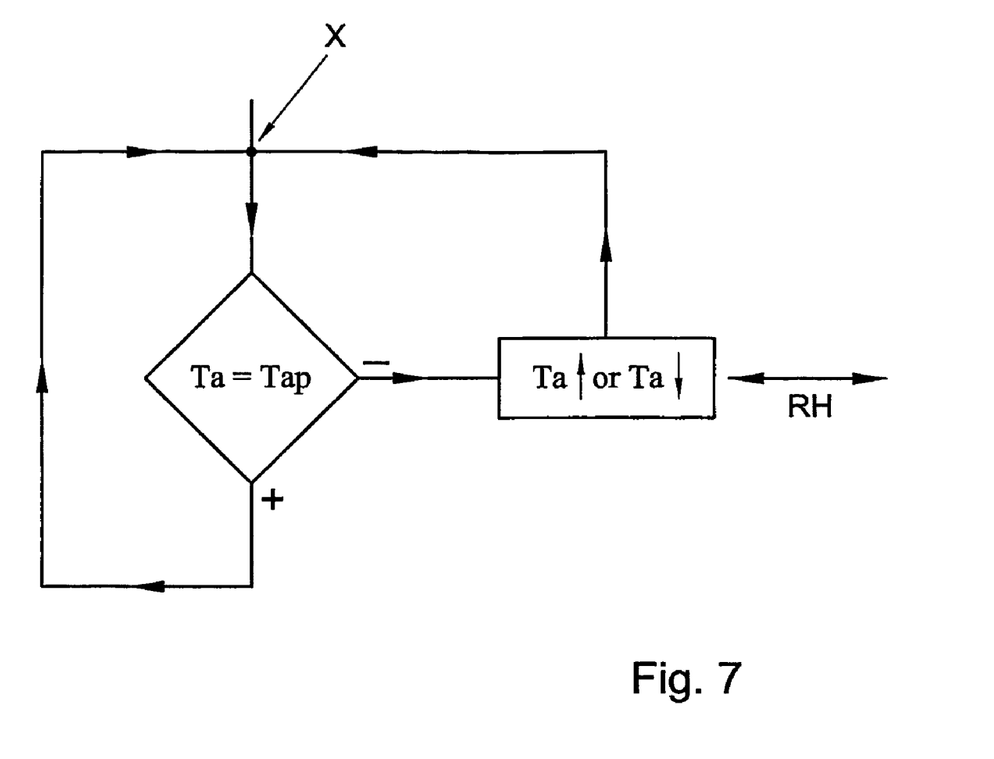
FIG. 7 shows a flow diagram for adjusting the air temperature in the hatching chamber.

For the method according to the invention, reference is hereby made to FIGS. 5, 6 and 7.

FIG. 5 shows a display of a part of a screen of a control computer. The most essential part hereof is formed by the bottom line where a thermometer symbol next to an egg then shows two numbers. These numbers are temperature values in degrees Fahrenheit, with Tep as the egg target temperature, or the embryo temperature, set by an operator of a hatching chamber, where such a temperature is said to be the temperature usual for an embryo. This means that, for different types or breeds of poultry, different target temperatures can or will be set. The temperature next thereto is the egg temperature Te measured at regular points in time for a number of hatching eggs, for instance measured with the apparatus 3 with sensor 23 discussed hereinabove.

In the group of numbers thereabove, also temperature values in degrees Fahrenheit, temperatures for regulation and measurement of the air temperature Ta (=Tair) are shown. In particular, Tap designates the air target temperature entered at a certain moment. This Tap is coupled to Tep and Te according to determined entered schemes. This is because it will be clear to any skilled person that, with too great deviations of Te relative to Tep, precisely the air temperature as an external parameter needs to be adjusted. In addition, this will, in turn, be closely linked to the endothermic or exothermic part of the hatching period. The numbers above and below them indicate limit temperatures Tap(max) and Tap(min), which bound a range A inside which the measured air temperature Ta is to be found, while Ta is indicated on the right side, noted in large numbers.

More in particular, the flow diagrams for measuring, reacting and regulating are shown in FIGS. 6 and 7. In these Figures, the decision steps are shown in diamonds. Plus and minus signs indicate whether the conditions described next to them have been met. The arrows ↓ and ↑ indicate the measure, that is, the decreasing or increasing of the temperature, respectively.

In FIG. 6, S indicates the start of a regulation-measurement cycle relating to the egg temperature. In the case that Te is higher or lower than the Tep entered, action is taken. In the case that the Te measured is lower or higher than Tep, air target temperature Tap is checked, in particular whether it is indeed inside the regulation range A. This will generally be the case.

Conversely, FIG. 7 shows the regulation of the air temperature Ta itself. The start is designated by X, where, first of all, Ta is compared with the air target temperature Tap. And, of course, the temperature in the room is increased, decreased or left unchanged depending thereon.

It is noted that adjusting Ta, for instance in the case of too great differences with Tap, may result in the regulation range being somewhat shifted. This also makes it understandable why, each time, the limit values are tested in FIG. 6. This shifting is also entered into the control, and may take place both automatically and manually. More in particular, for the situation with transition from more to less endothermic, and then to exothermic, such a shift of Tap, and in general a corresponding shift of the regulation range, can be used with advantage.

Further, in FIG. 7, RH designates the relative humidity. It will be clear to any skilled person that the heat balance around the egg is not only determined by the temperature but certainly also by the local humidity. Therefore, the adjustment of the temperature cannot be detached from the regulation of the humidity.

According to the invention, precisely the egg temperatures Te can be measured with the apparatus 3, in particular the sensor 23 with connections coupled thereto, in a very suitable manner. In the case of this apparatus 3, this takes place contactlessly. With advantage, this will cause the fewest risks of deviating or wrong temperature measurements.

Small modifications in the apparatus as presented in this application are understood to be within the scope of the appended claims, such as for instance the choice of plastics, the number of sensors in the apparatus and the manner of providing and attaching. It will further be clear to any skilled person that measurement schemes may also provide for continuous measuring and measuring in very small regulation steps which may be considered to proceed continuously. Further, in this bioresponse application, points in time determined for measurement will usually show a continuous monitoring, measuring and controlling.

What is claimed is:

1. An apparatus for measuring, with infrared thermometers, temperatures of hatching eggs placed in nests of hatching trays which are arranged in an incubator, wherein, for a preselected number of trays, the temperature is measured of a predetermined number of eggs, wherein during the hatching period, each individual thermometer contactlessly measures the temperature of a corresponding individual egg according to a pre-entered measurement scheme, wherein the measuring signals obtained control a temperature control regulation wherein the thermometers have been provided on holders which are placed on the hatching trays between the eggs, whereby the temperatures of at least two individual hatching eggs are measured.

2. An apparatus for measuring, with infrared thermometers, temperatures of hatching eggs placed in nests of hatching trays which are arranged in an incubator, wherein, for a preselected number of trays, the temperature is measured of a predetermined number of eggs, wherein during the hatching period, each individual thermometer contactlessly measures the temperature around a corresponding individual egg arranged in the incubator according to a pre-entered measurement scheme, wherein the measuring signals obtained control a temperature control regulation.

3. An apparatus according to claim 2, wherein the apparatus further comprises a robot to automatically position holders near the hatching eggs.

4. An apparatus according to claim 2, wherein the apparatus is used for carrying out a method for processing bioresponse signals coming from organisms living in a well-defined living space, which are each comprised in a microenvironment, wherein signals are obtained in online measuring of bioresponse variables, the bioresponse signals being processed in at least real-time in a signal processor, wherein the organisms are monitored in the said microenvironments, the bioresponse variables being adjusted by corresponding signal control apparatuses in accordance with a living space control model, wherein the living space comprises an incubator for hatching out hatching eggs, wherein the bioresponse variables are measured and controlled by at least one of optical, electrical, magnetic, acoustic or mechanical bioresponse signals.

5. An apparatus according to claim 4, wherein the bioresponse signals are non-invasively measured.

6. An apparatus according to claim 4, wherein the bioresponse signals for hatching eggs are chosen from at least one of eggshell temperature, weight loss, pulse, blood pressure, respiration, growth, growth rate, activity, heat production, moisture production, and sound production.

7. An apparatus according to claim 4, wherein the bioresponse signals for hatching eggs in the said microenvironments are chosen from at least one of temperature, gas concentrations, sound intensity and sound frequency.

8. An apparatus according to claim 4, wherein the living space control model comprises an intelligent control algorithm for a process control based on at least one of a model-based control with prediction and a process control with fuzzy logic.

9. An apparatus according to claim 4, wherein the living space control model controls the hatching out according to information obtained from previously hatched eggs in the microenvironment.

10. An apparatus according to claim 4, wherein climate conditions are regulated in an incubator during the hatching process, including the setting, the measuring and the monitoring, as well as the adjusting of gas concentrations and climate parameters including at least one of air temperature, air humidity, carbonic acid content, and oxygen content, and further the measuring of egg temperatures of at least a number of hatching eggs, wherein the air temperature is regulated by:
  entering a hatching egg target temperature Tep into the control at the start of the hatching process;
  measuring the egg temperature Te at a determined point in time after the start;
  comparing the measured Te and Tep, wherein, in the case of a difference between Te and Tep, an air temperature signal for adjusting the air temperature Ta according to an air temperature regulation is delivered; and
  repeating these steps during the hatching process at a determined next point in time.

11. An apparatus according to claim 10, wherein the air temperature regulation for adjusting the air temperature Ta successively includes:
  entering an air target temperature Tap into the control at the start of the hatching process, wherein, further, an air temperature control range A is entered between limit temperatures Tap(min) and Tap(max), with Tap(min) <Tap<Tap(max);
  measuring the air temperature Ta at a determined point in time after the start;
  comparing the measured Ta with the temperatures in A, wherein, in the case that Ta has increased or decreased by a predetermined difference, the air temperatures are adjusted according to a determined control scheme; and
  repeating these steps during the hatching process at a determined next point in time.

12. An apparatus according to claim 11, wherein when the air temperature Ta exceeds one of the limit temperatures of A, an alarm signal is delivered.

13. An apparatus according to claim 10, wherein the egg temperature is contactlessly measured.

14. An apparatus according to claim 13, wherein the egg temperatures are measured with an apparatus for measuring, with infrared thermometers, temperatures of hatching eggs placed in nests of hatching trays which are arranged in an incubator, wherein, for a preselected number of trays, the temperature is measured of a predetermined number of eggs, wherein during the hatching period, each individual thermometer contactlessly measures the temperature of a corresponding individual egg according to a pre-entered measurement scheme, wherein the measuring signals obtained control a temperature control regulation.

15. An apparatus according to claim 2, wherein the apparatus comprises a holder part and a lid part, the holder part including a bottom provided with two plug-in units and a plug-in slot enabling clamping of the apparatus in at least one of compartments and nests.

16. An apparatus according to claim 2, wherein the infrared thermometers are calibrated for different hatching chambers.

17. An apparatus according to claim 2, wherein the predetermined number of eggs is four.

18. An apparatus according to claim 2, wherein the infrared thermometers are arranged to measure the egg temperature at regular points in time.

* * * * *